United States Patent
Shoshan et al.

(10) Patent No.: US 11,315,342 B2
(45) Date of Patent: Apr. 26, 2022

(54) AUTOMATED EXPLANATION OF MACHINE LEARNING PREDICTIONS USING CLASSIFICATION SCORE TARGETING

(71) Applicant: International Business Machines Corporation, Armonk, NY (US)

(72) Inventors: Yoel Shoshan, Haifa (IL); Vadim Ratner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 16/690,169

(22) Filed: Nov. 21, 2019

(65) Prior Publication Data
US 2021/0158075 A1 May 27, 2021

(51) Int. Cl.
*G06V 10/75* (2022.01)
*G06K 9/62* (2022.01)
*G06N 20/00* (2019.01)
*G06N 5/04* (2006.01)

(52) U.S. Cl.
CPC ........... *G06V 10/754* (2022.01); *G06K 9/623* (2013.01); *G06K 9/6232* (2013.01); *G06N 5/045* (2013.01); *G06N 20/00* (2019.01)

(58) Field of Classification Search
CPC G06T 2207/20081; G06T 2207/20084; G06V 30/194; G06V 10/82
See application file for complete search history.

(56) References Cited

U.S. PATENT DOCUMENTS

| | | | | |
|---|---|---|---|---|
| 7,359,544 B2* | 4/2008 | Gao | ..................... | G06K 9/6253 382/145 |
| 7,545,985 B2* | 6/2009 | Zhang | .................. | G06T 7/0002 382/227 |
| 7,583,832 B2* | 9/2009 | Okuda | ..................... | G06T 7/001 348/125 |
| 8,391,626 B2* | 3/2013 | Takahashi | ............... | G06T 5/003 348/208.4 |
| 9,062,085 B2* | 6/2015 | Abdur-Rashid | .... | C07F 15/0066 |
| 9,087,297 B1* | 7/2015 | Filippova | ............... | G06V 20/41 |
| 9,710,729 B2* | 7/2017 | Chidlovskii | ........... | G06V 20/00 |

\* cited by examiner

*Primary Examiner* — Yosef Kassa

(74) *Attorney, Agent, or Firm* — Dvir Gassner

(57) ABSTRACT

Automated explanation of machine learning predictions, by: Obtaining an input, a machine learning model, and a classification score produced by application of the machine learning model to the input. Optimizing iterative application of the machine learning model to perturbations of the input, wherein a target of said optimizing is at least a predefined non-zero classification score. Generating, based on one of the perturbations which achieved the predefined non-zero classification score, an explanation to the classification score produced by the application of the machine learning model to the input.

20 Claims, 4 Drawing Sheets

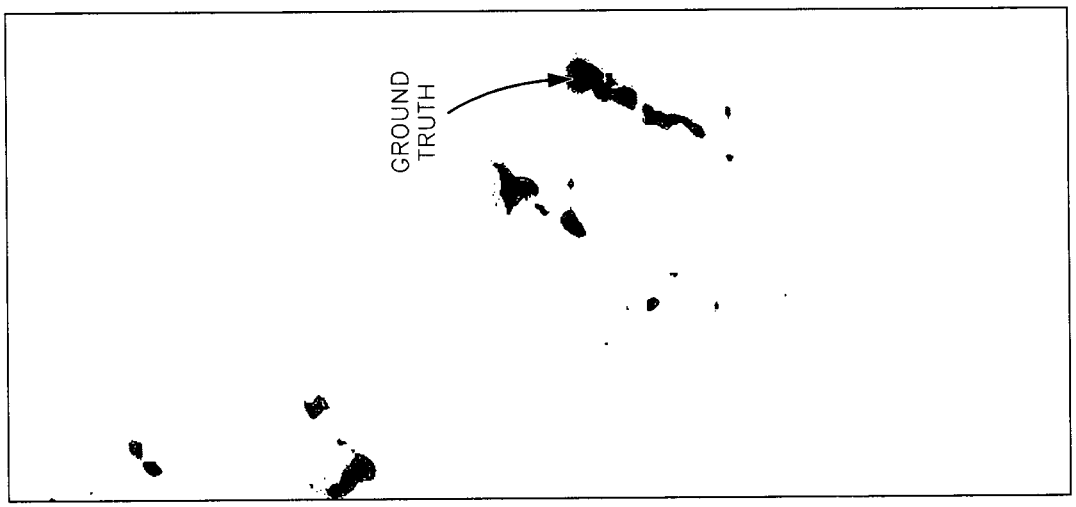

AUTOMATED EXPLANATION OF MACHINE LEARNING PREDICTIONS USING CLASSIFICATION SCORE TARGETING

BACKGROUND

The invention relates to the field of machine learning.

Machine learning is a vast field, in which computers learn to perform tasks without explicit instructions from a human but rather based on patterns and inference. Machine learning approaches include, for example, supervised and unsupervised learning, anomaly detection, association rule learning, reinforcement learning, and others. These learning approaches create models that can perform specific tasks. Common models include, for example, artificial neural networks (ANNs, which are the cornerstone of deep learning techniques), support vector machines (SVMs), decision trees, and genetic algorithms.

One of the challenges in machine learning is the need to explain the decisions of a certain model to human users. Many machine learning models make black-box predictions and decisions, thereby preventing users from understanding why certain predictions were made. For instance, when a machine learning model is applied to a new domain, the user will likely want to know what drives various decisions by the model before fully deploying it in the field. Similarly, when machine learning is used for prediction of critical information, and the prediction later calls for irreversible actions by the user, the user might want to verify or understand the prediction before taking such actions; such is the case with machine learning predictions in the healthcare field, for example.

Various approaches to generation of explanations to machine learning predictions have been proposed, such as backpropagation-based methods, activation-based methods, and perturbation-based methods. In the latter, the model is applied, as-is, to many perturbations of the input, in an attempt to identify those parts of the input which have been the greatest driver of the prediction. Perturbation-based explanation is popular in the field of image classification, where the explanation is typically given visually, as a saliency map highlighting the parts of the input image which are responsible, or mostly responsible, for a certain classification of the image.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a method comprising: obtaining: an input, a machine learning model, and a classification score produced by application of the machine learning model to the input; optimizing iterative application of the machine learning model to perturbations of the input, wherein a target of said optimizing is at least a predefined non-zero classification score; and generating, based on one of the perturbations which achieved the predefined non-zero classification score, an explanation to the classification score produced by the application of the machine learning model to the input.

Another embodiment provides a system comprising: (a) at least one hardware processor; and (b) a non-transitory computer-readable storage medium having program code embodied therewith, the program code executable by said at least one hardware processor to: obtain: an input, a machine learning model, and a classification score produced by application of the machine learning model to the input; optimize iterative application of the machine learning model to perturbations of the input, wherein a target of said optimizing is at least a predefined non-zero classification score; and generate, based on one of the perturbations which achieved the predefined non-zero classification score, an explanation to the classification score produced by the application of the machine learning model to the input.

A further embodiment provides a computer program product comprising a non-transitory computer-readable storage medium having program code embodied therewith, the program code executable by at least one hardware processor to: obtain: an input, a machine learning model, and a classification score produced by application of the machine learning model to the input; optimize iterative application of the machine learning model to perturbations of the input, wherein a target of said optimizing is at least a predefined non-zero classification score; and generate, based on one of the perturbations which achieved the predefined non-zero classification score, an explanation to the classification score produced by the application of the machine learning model to the input.

In some embodiments, the optimizing comprises performing the following actions iteratively: generating the perturbations; applying the machine learning model to each of the perturbations, to produce a classification score for each of the perturbations; and determining which one of the perturbations achieved a classification score equal or closest to the predefined non-zero classification score.

In some embodiments, the explanation comprises an indication of one or more aspects of the input which had the most contribution to the classification score produced by the application of the machine learning model to the input.

In some embodiments, the input is an image, and said generating of the explanation comprises generating a saliency map in which the one or more aspects are one or more regions of the image.

In some embodiments, the predefined non-zero classification score is between 0.1 and the classification score produced by application of the machine learning model to the input.

In some embodiments, the predefined non-zero classification score is between 0.5 and the classification score produced by application of the machine learning model to the input.

In some embodiments, the predefined non-zero classification score is between 10-90% of the classification score produced by application of the machine learning model to the input.

In some embodiments, the predefined non-zero classification score is between 50-90% of the classification score produced by application of the machine learning model to the input.

In some embodiments, the input is selected from the group consisting of: an audio file, a video file, and a vector of values.

In some embodiments, the method is performed by at least one hardware processor.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 6 is a thresholded version of the saliency map of FIG. 5.

DETAILED DESCRIPTION

Figure 1:
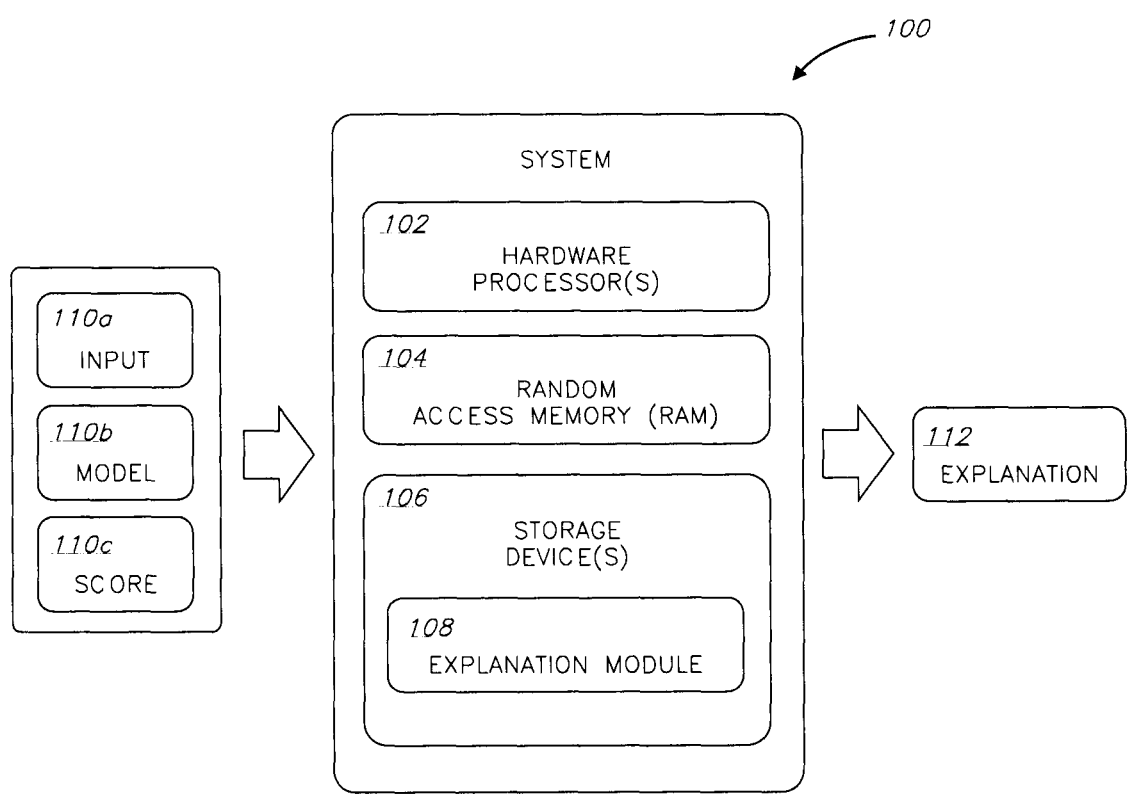
FIG. 1 is a block diagram of an exemplary system for automated explanation of machine learning predictions, according to an embodiment.

Disclosed herein is a method, system, and computer program product for automated generation of an explanation to a prediction (also "classification") made by a machine learning model. This automated generation is based on the perturbation approach, and advantageously includes optimizing the perturbation generation and classification process to a predefined, non-zero target score. Surprisingly, such non-zero target score has been proven experimentally by the inventors to yield highly-beneficial explanations.

The generated explanation may indicate to the user which aspect(s) of the input had the most contribution to the classification made by the machine learning model. As the disclosed technique is suitable for various types of input, such as images, videos, audio, or any vector of values, the generated explanation may be presented in a way that suits the type of input.

Throughout this description, the terms "machine learning model" and "machine learning classifier" are used interchangeably, and are abbreviated "model" or "classifier" for simplicity. These terms are intended to refer to any type of machine learning model which is capable of producing an output, be it a classification, a prediction, or generation of new data, based on input.

In addition, throughout this description, the terms "classification" and "prediction" are used interchangeably for reasons of simplicity, and are intended to refer to any type of output of a machine learning model. This output may be in the form of a class and a score which indicates the certainty that the input belongs to that class. For example, if the input is a mammogram and the machine learning model is a breast cancer classifier, then the output may be a class named "malignant" or "cancerous,", along with a score in the range of 0 to 1, with 0 indicating no malignancy at all, and 1 indicating certain malignancy. If the input is a certain sequence (such as an audio sequence of human speech) and the machine learning model is of the sequence-to-sequence ("seq2seq") kind (e.g., a speech-to-text engine), then the output may be a predicted sequence (e.g., a sequence of written words) along with a certainty score for each element in the sequence. Similarly, various types of machine learning models may be configured to handle different types of input and produce respective types of output; all such types are intended to be covered by present embodiments.

Furthermore, some classifiers may produce more than one classification per input. For instance, a tumor classifier may process a medical image and output three different classifications for it, "malignant," "benign," and "clean," each with its own score. The class with the highest score is meant to convey the likely classification of the image. In such cases, the present explanation technique may be employed on each of these classifications, if so desired by the user, or only on the classification which had the highest score. This is left for the discretion of the user.

Reference is now made to FIG. 1, which shows a block diagram of an exemplary system 100 for automated explanation of machine learning predictions, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as an explanation module 108. The software components may include an operating system having various software components and/or drivers for controlling and managing general system tasks (e.g., memory management, storage device control, power management, etc.), and facilitating communication between various hardware and software components.

System 100 may operate by loading instructions of explanation module 108 into RAM 104 as they are being executed by processor(s) 102. The instructions of explanation module 108 may cause system 100 to obtain an input 110a, a machine learning model 110b, and a classification score 110c produced by application of the machine learning model to the input 110, process them, and output an explanation 112.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, etc. (not shown). Components of system 100 may be co-located or distributed (e.g., in a distributed computing architecture).

Figure 2:
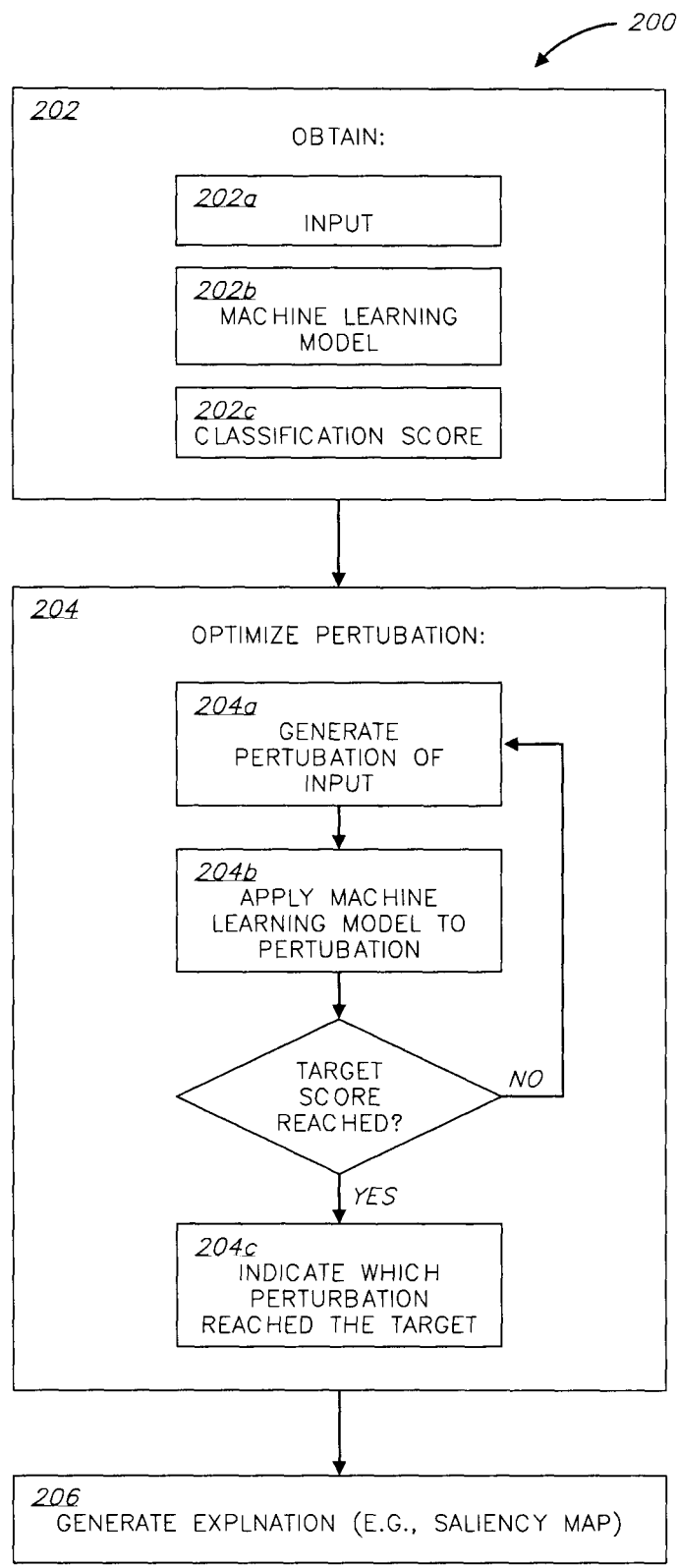
FIG. 2 is a flowchart of a method for automated explanation of machine learning predictions, according to an embodiment.

The instructions of explanation module 108 are now discussed with reference to the flowchart of FIG. 2, which illustrates a method 200 for automated explanation of machine learning predictions, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

In a step 202, the following are obtained: an input 202a, a machine learning model 202b, and a classification score 202c for at least one classification produced by applying the machine learning model to the input. The term "obtained" does not necessarily mean that these elements need to physically reside on the computer system (e.g., system 100 of FIG. 1) executing method 200. Rather, one or more of them may remain on a different system and be accessed, such as over a computer network, by the computer system which executes method 200.

While it is not necessary to obtain also the name of the class associated with classification score 202c, such as if machine learning model 202b only outputs a single class, the name may still be obtained if it is desired to display it to the user alongside the explanation.

A step 204, may include optimization of iterative application of machine learning model 202b to perturbations of input 202a, wherein at least one of the targets of this optimization process is set to a predefined, non-zero classification score. One or more additional targets may include, for example, sparsity of the perturbations, smoothness of the perturbations, etc., as known in the art.

More specifically, the optimization process may include the following two sub-steps, performed iteratively: A first sub-step 204a of generating a perturbation of input 202a, and a second sub-step 204b of applying machine learning model 204b the generated perturbation, thereby producing a classification score for that perturbation. Then, a third sub-step 204c outputs an indication of the iterated perturbation which achieved the predefined, non-zero classification score, or which at least was closest to it, so that the pertinent perturbation can be used in the next step.

Step 204 may be performed using any perturbation optimization technique known in the art, but with the target set to the predefined, non-zero classification score. Common techniques include iterative deletion or alteration of different aspects of the input. In case input 202a is an image (or a video frame, for that matter), then different region(s) of the image may be gradually deleted or altered (e.g., by blurring, introduction of noise, etc.) according to some predefined mechanism. Suitable mechanisms for generating perturbations are disclosed, for example, in: Y. Shoshan, V. Ratner, "Regularized Adversarial Examples for Model Interpretability," arXiv:1811.07311v2, Nov. 21, 2018, which is incorporated herein by reference in its entirety; J. Wagner et al., "Interpretable and Fine-Grained Visual Explanations for Convolutional Neural Networks," IEEE Conference on Computer Vision and Pattern Recognition (CVPR), June 2019; R. Fong et al., "Interpretable Explanations of Black Boxes by Meaningful Perturbation," Proceedings of the IEEE International Conference on Computer Vision (ICCV)," pages 3429-3437, 2017; M Du at al., "Towards Explanation of Dnn-Based Prediction with Guided Feature Inversion," Proceedings of the 24$^{th}$ ACM SIGKDD International Conference on Knowledge Discovery & Data Mining, pages 1358-1367, 2018; Ch. Chang at al., "Explaining Image Classifiers By Counterfactual Generation," arXiv: 1807.08024, July 2018; and P. Dabkowski et al., "Real Time Image Saliency for Black Box Classifiers," Advances in Neural Information Processing Systems (NIPS), pages 6967-6976, 2017.

The predefined, non-zero classification score is optionally any value between 0.1 (i.e., 10%) and classification score 202c (which is typically, but not necessarily, in the range of 0.7-1.0, i.e., 70-100%). In more specific embodiments, the predefined, non-zero classification score is any value between 0.2 and classification score 202c, 0.3 and classification score 202c, 0.4 and classification score 202c, 0.5 and classification score 202c, 0.6 and classification score 202c, 0.7 and classification score 202c, 0.8 and classification score 202c, or 0.9 and classification score 202c. The predefined, non-zero classification score need not necessarily be defined as an absolute value, but may rather be provided as a percentage of classification score 202c, such as 10-90% of classification score 202c, or any integer or decimal value within that range.

It should be noted that, when the target (or one of the targets) of the optimization process of step 204 is set to the predefined, non-zero classification score, the process is still different than any prior optimization technique that may occasionally complete when reaching a non-zero classification score, but whose target was minimization (i.e., zero). That is, the important aspect of step 204 is that the target is set to the non-zero classification score, and the optimization process penalizes any classification score deviating from the non-zero classification score regardless of the magnitude of deviation. For example, if the target, non-zero classification score is predefined at 0.8, then a classification score of 0.75 will be penalized just as much as a classification score of 0.85. Accordingly, the optimization process of present embodiments is cardinally different than any "minimization" process.

In step 206, based on the perturbation which achieved the predefined, non-zero classification score (or at least which was closest to it), an explanation is generated as to classification score 202c produced by the application of machine learning model 202b to input 202a.

The explanation may include an indication of one or more aspects of the input which had the most contribution to classification score 202c. As method 200 is suitable for various types of input 202a, such as images, videos, audio, or any vector of values, the generated explanation may be presented in a way that suits the type of input 202a. For example, if input 202a is an image, the explanation may be in the form of a saliency map in which the region(s) of the image which most influenced the classification of the image are highlighted. For video input, the explanation may include, for example, an animated saliency map and/or an indication of the frames (or respective timeframes) which most influenced the classification of the entire video. For audio input, the explanation may include an audio sequence in which only the most influential sounds are audible (or are played at a higher volume than all other sounds), and/or an indication of parameters such as timeframes, frequencies, etc. which were most influential on the classification. For vector input, the explanation may simply include those elements of the vector, or their indices, which were most influential. Those of skill in the art will recognize that other modes of presenting the explanation to a user are also possible.

The explanation may be graphically and/or textually presented to a user on a computer screen, or by any other output means from a computer to the user.

Experimental Results

The present technique for automated explanation of machine learning predictions was tested with an Inception ResNet V2 model (C. Szegedy et al, "Rethinking the Inception Architecture for Computer Vision," Proceedings of the IEEE Conference on Computer Vision and Pattern Recognition, pages 2818-2826, 2016) and the DDSM dataset (M. Heath et al., "The Digital Database for Screening Mammography," Proceedings of the 5$^{th}$ International Workshop on Digital Mammography, pages 212-218, Medical Physics Publishing, 2000), which is a digital database of high-resolution mammograms manually labeled as normal, malignant, or benign.

Eighty percent of the mammograms in the DDSM dataset were used for training, and twenty percent were used for validation, as is customary. Out of the validation mammograms, a few with a "malignant" classification of score 0.9 (90%) or higher were chosen for the experiment.

Figure 3:
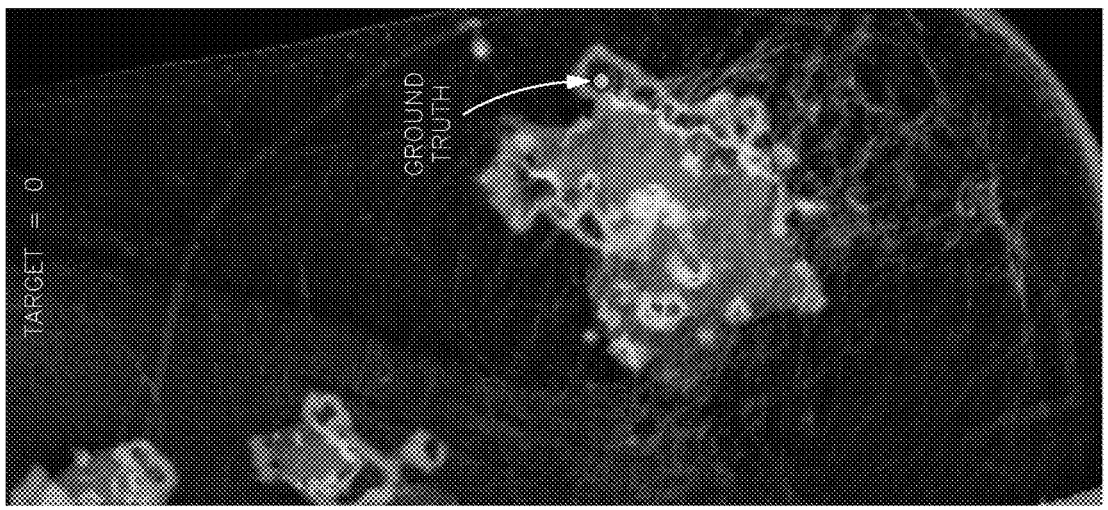
FIG. 3 is a saliency map based on perturbation optimization to a target classification score of 0.8, according to experimental results.
Figure 4:
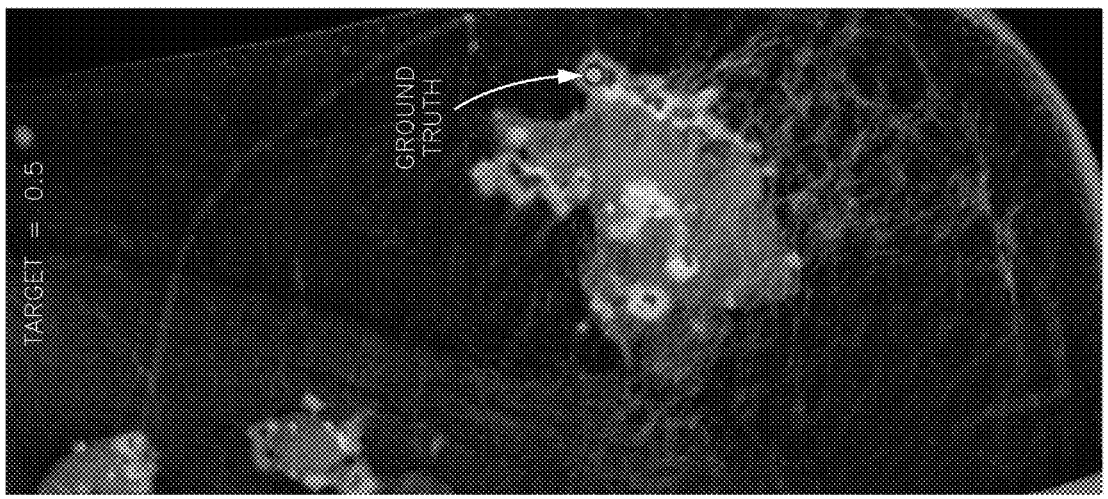
FIG. 4 is a saliency map based on perturbation optimization to a target classification score of 0.5, according to experimental results.
Figure 5:
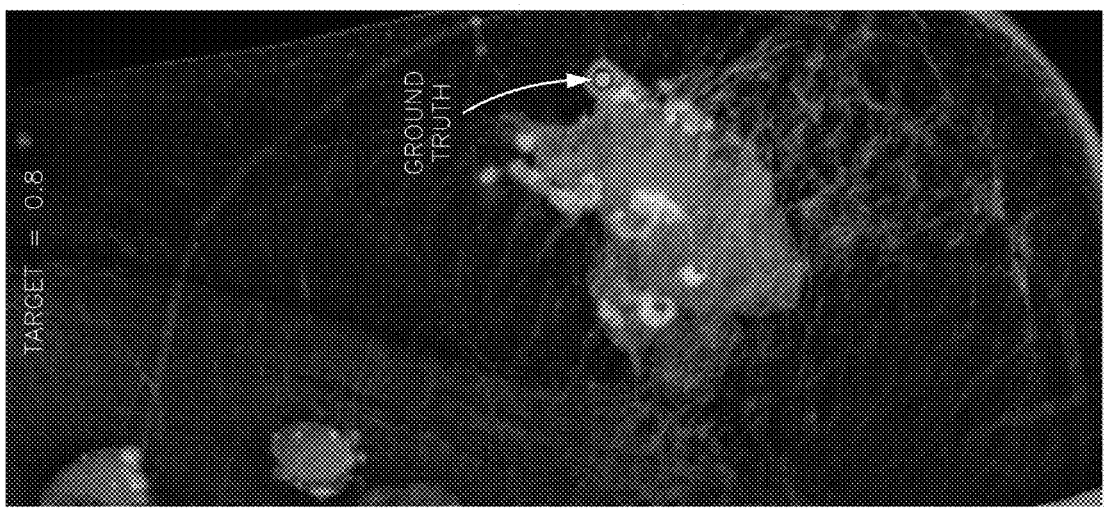
FIG. 5 is a saliency map based on perturbation optimization to a target classification score of 0 (zero), according to the prior art.

FIGS. 3 and 4 show the experimental results as to one of the chosen mammograms. Only one of the chosen mammograms was selected for presentation here merely for reasons of brevity, despite all of them exhibiting similar qualities. The application of the present technique to that mammogram, based on the perturbation generation method of Y. Shoshan and V. Ratner 2018 (id.), yielded the saliency map shown in FIG. 3 for a classification target score of 0.8, and the saliency map shown in FIG. 4 for a classification target score of 0.5. For comparison, a saliency map which is based on the traditional optimization target of 0 (zero) is shown in FIG. 5. Saliency is shown on a customary heatmap scale of red (most salient) to blue (least salient).

The 0.8 saliency map (FIG. 3) appears to have provided the best overall explanation of aspects of the input that are mostly responsible for its classification as malignant, because it shows the ground-truth point of malignancy (pointed at by an arrow added for illustrative reasons and not included in the real saliency map) as highly-salient, but at the same time does not mischaracterize too many other regions as highly-salient (there are only very few tiny red regions). The second-best explanation is that of the 0.5 map (FIG. 4), which shows the ground-truth point of malignancy plus slightly more highly-salient regions than the 0.8 map, but still within reason. The worst explanation is depicted by the 0 (zero) saliency map (FIG. 5), in which too many regions are shown as highly-salient, despite some of them lacking any malignant features.

Accordingly, the 0.8 saliency map (FIG. 3) is a much better explanation of the prediction made by the machine learning model than the common, zero (0) saliency map (FIG. 5), and will not cause the observer to mistakenly think that there were numerous malignant regions in the mammogram.

Accordingly, targeting a non-zero score in the perturbation optimization has shown to yield more truthful explanations than perturbation minimization to zero.

Furthermore, the experimental results confirm that the saliency maps of FIGS. 3 and 4 are superior to a simple thresholding of the traditional (score=0) saliency map of FIG. 5. When the latter is thresholded at 88% (which is the ratio of the 0.8 classification score of FIG. 3 to the 0.9 classification score of the non-perturbed input), it still shows too many irrelevant regions that derogate from the truthfulness of the explanation, as shown in FIG. 6.

The techniques discussed in the above experimental results section are considered embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining: an input, a machine learning model, and a classification score produced by application of the machine learning model to the input;
   optimizing iterative application of the machine learning model to perturbations of the input, wherein a target of said optimizing is at least a predefined non-zero classification score; and
   generating, based on one of the perturbations which achieved the predefined non-zero classification score, an explanation to the classification score produced by the application of the machine learning model to the input.

2. The method according to claim 1, wherein said optimizing comprises performing the following actions iteratively:
   generating the perturbations;
   applying the machine learning model to each of the perturbations, to produce a classification score for each of the perturbations; and
   determining which one of the perturbations achieved a classification score equal or closest to the predefined non-zero classification score.

3. The method according to claim 1, wherein the explanation comprises an indication of one or more aspects of the input which had the most contribution to the classification score produced by the application of the machine learning model to the input.

4. The method according to claim 3, wherein:
   the input is an image, and
   said generating of the explanation comprises generating a saliency map in which the one or more aspects are one or more regions of the image.

5. The method according to claim 4, wherein the predefined non-zero classification score is between 0.1 and the classification score produced by application of the machine learning model to the input.

6. The method according to claim 4, wherein the predefined non-zero classification score is between 0.5 and the classification score produced by application of the machine learning model to the input.

7. The method according to claim 4, wherein the predefined non-zero classification score is between 10-90% of the classification score produced by application of the machine learning model to the input.

8. The method according to claim 4, wherein the predefined non-zero classification score is between 50-90% of the classification score produced by application of the machine learning model to the input.

9. The method according to claim 1, wherein the input is selected from the group consisting of: an audio file, a video file, and a vector of values.

10. The method according to claim 1, performed by at least one hardware processor.

11. A system comprising:
    (a) at least one hardware processor; and
    (b) a non-transitory computer-readable storage medium having program code embodied therewith, the program code executable by said at least one hardware processor to:
    obtain: an input, a machine learning model, and a classification score produced by application of the machine learning model to the input, optimize iterative application of the machine learning model to perturbations of the input, wherein a target of said optimizing is at least a predefined non-zero classification score, and generate, based on one of the perturbations which achieved the predefined non-zero classification score, an explanation to the classification score produced by the application of the machine learning model to the input.

12. The system according to claim 11, wherein the optimizing comprises performing the following actions iteratively:

generating the perturbations;

applying the machine learning model to each of the perturbations, to produce a classification score for each of the perturbations; and determining which one of the perturbations achieved a classification score equal or closest to the predefined non-zero classification score.

13. The system according to claim 11, wherein the explanation comprises an indication of one or more aspects of the input which had the most contribution to the classification score produced by the application of the machine learning model to the input.

14. The system according to claim 13, wherein:

the input is an image, and said generating of the explanation comprises generating a saliency map in which the one or more aspects are one or more regions of the image.

15. The system according to claim 14, wherein the predefined non-zero classification score is between 0.1 and the classification score produced by application of the machine learning model to the input.

16. The system according to claim 14, wherein the predefined non-zero classification score is between 0.5 and the classification score produced by application of the machine learning model to the input.

17. The system according to claim 14, wherein the predefined non-zero classification score is between 10-90% of the classification score produced by application of the machine learning model to the input.

18. The system according to claim 14, wherein the predefined non-zero classification score is between 50-90% of the classification score produced by application of the machine learning model to the input.

19. The system according to claim 11, wherein the input is selected from the group consisting of: an audio file, a video file, and a vector of values.

20. A computer program product comprising a non-transitory computer-readable storage medium having program code embodied therewith, the program code executable by at least one hardware processor to:

obtain: an input, a machine learning model, and a classification score produced by application of the machine learning model to the input;

optimize iterative application of the machine learning model to perturbations of the input, wherein a target of said optimizing is at least a predefined non-zero classification score; and generate, based on one of the perturbations which achieved the predefined non-zero classification score, an explanation to the classification score produced by the application of the machine learning model to the input.

* * * * *